United States Patent
Frech et al.

(10) Patent No.: US 8,006,787 B2
(45) Date of Patent: Aug. 30, 2011

(54) HYBRID VEHICLE

(75) Inventors: Rolf Frech, Weissach (DE); Markus Goehring, Nufringen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 458 days.

(21) Appl. No.: 12/168,494

(22) Filed: Jul. 7, 2008

(65) Prior Publication Data

US 2009/0029823 A1   Jan. 29, 2009

(30) Foreign Application Priority Data

Jul. 28, 2007   (DE) .......................... 10 2007 035 423

(51) Int. Cl.
  *B60W 10/00*   (2006.01)
(52) U.S. Cl. .............. 180/65.265; 180/65.21; 180/65.31
(58) Field of Classification Search ............... 180/65.21, 180/65.265, 65.27, 65.29, 65.28, 65.275, 180/65.285, 65.31; 701/20, 103, 99, 22, 701/209, 70
See application file for complete search history.

(56) References Cited

U.S. PATENT DOCUMENTS

| | | | |
|---|---|---|---|
| 6,564,135 B2 * | 5/2003 | Grob et al. ....................... 701/70 |
| 6,853,893 B2 * | 2/2005 | Corcione et al. ................ 701/22 |
| 7,628,236 B1 * | 12/2009 | Brown ........................ 180/65.21 |
| 2002/0143456 A1 * | 10/2002 | Grob et al. ....................... 701/70 |
| 2005/0228553 A1 * | 10/2005 | Tryon .............................. 701/22 |
| 2007/0152499 A1 * | 7/2007 | Tonoli et al. .................... 303/20 |
| 2008/0021628 A1 * | 1/2008 | Tryon .............................. 701/99 |
| 2008/0027639 A1 * | 1/2008 | Tryon ............................. 701/209 |
| 2008/0051977 A1 * | 2/2008 | Tryon ............................. 701/103 |
| 2008/0227589 A1 * | 9/2008 | Zillmer et al. ..................... 477/3 |

* cited by examiner

*Primary Examiner* — Hau V Phan
(74) *Attorney, Agent, or Firm* — Gerald E. Hespos; Michael J. Porco

(57) ABSTRACT

In a hybrid vehicle having at least one electric motor which is usable as a generator and charges a vehicle battery during a recuperation phase, there is provided an additional actuating element independent of a brake system which is used to transfer the electric motor into its recuperation state without activating the brake system. Alternatively, the additional actuating element may operate in conjunction with the brake system, such that the brake pedal may also be used to transfer the electric motor into its recuperation state.

5 Claims, 1 Drawing Sheet

HYBRID VEHICLE

CROSS-REFERENCE TO RELATED APPLICATIONS

This application claims the priority of German Application No. 10 2007 035 423.3, filed Jul. 28, 2007, the disclosure of which is expressly incorporated by reference herein.

BACKGROUND AND SUMMARY OF THE INVENTION

The present invention relates to a hybrid vehicle having at least one electric motor, which is usable as a generator during a recuperation phase and charges a vehicle battery and/or decelerates the vehicle.

The electric motor is typically driven as a generator during the recuperation as soon as a driver of the hybrid vehicle actuates a brake of the hybrid vehicle. However, the driver cannot clearly "feel" the brake pedal force at which recuperation is occurring as compared to the brake pedal force at which the conventional brake is activated. Strongly consumption-optimized driving is thus made more difficult.

The present invention is concerned with the problem of improving a hybrid vehicle in such a manner that a recuperation function thereof may be used better in connection with a predictive mode of driving.

The invention is based on the general idea of providing an actuating element independent of a brake system of a hybrid vehicle, by which a recuperation procedure may be initiated without activating the brake system per se. If the driver of the hybrid vehicle thus establishes that he must reduce the travel velocity and if he additionally assumes that he may achieve the deceleration required for this purpose exclusively using the electric-motor brake, i.e., using recuperation, he actuates the additional actuating element independently of the brake system and transfers the electric motor into its recuperation state, in which it acts as a generator. Especially predictive and thus energy-saving driving may be achieved by the additional actuating element independent of the brake system, wear of the brake system additionally being able to be reduced, because it is only used when a braking force generated by an electric motor found in the recuperation state is not sufficient for the required deceleration.

According to an advantageous refinement of the solution according to the invention, the electric motor is also transferable into its recuperation state via an actuation of the brake system of the hybrid vehicle. The additional actuating element independent of the brake system is thus also to be implemented in combination with a typical recuperation concept, the driver of the hybrid vehicle then being able to select whether he initiates the recuperation phase of the electric motor using the additional actuating element or using actuation of the brake system, for example, by stepping on a brake pedal. Of course, not only alternative actuation of the actuating element or the brake system, but rather also simultaneous actuation is also possible. In particular, this combination allows the driver to first reduce the velocity of the hybrid vehicle using the additional actuating element and, if he notices that this will not be sufficient, to simultaneously position a foot on the brake pedal and press it slightly. If a stronger deceleration is required at the end of the deceleration procedure than is possible through the electric-motor brake, the driver simply steps more strongly on the brake pedal and thus activates the brake system.

The actuating element is expediently manually operable. This offers the special advantage that the electric motor is transferable easily, using an actuating element to be actuated manually, into its recuperation state and simultaneously a spatial and haptic separation between the brake pedal and the additional actuating element may be achieved, by which an individual motoric may also be implemented, which spatially separates an actuation of the actuating element from an actuation of the brake system.

It is obvious that the above-mentioned features and the features to be explained hereafter are usable not only in the particular specified combination, but rather also in other combinations or alone without leaving the scope of the present invention.

Other objects, advantages and novel features of the present invention will become apparent from the following detailed description when considered in conjunction with the accompanying drawings.

DETAILED DESCRIPTION

Figure 1:
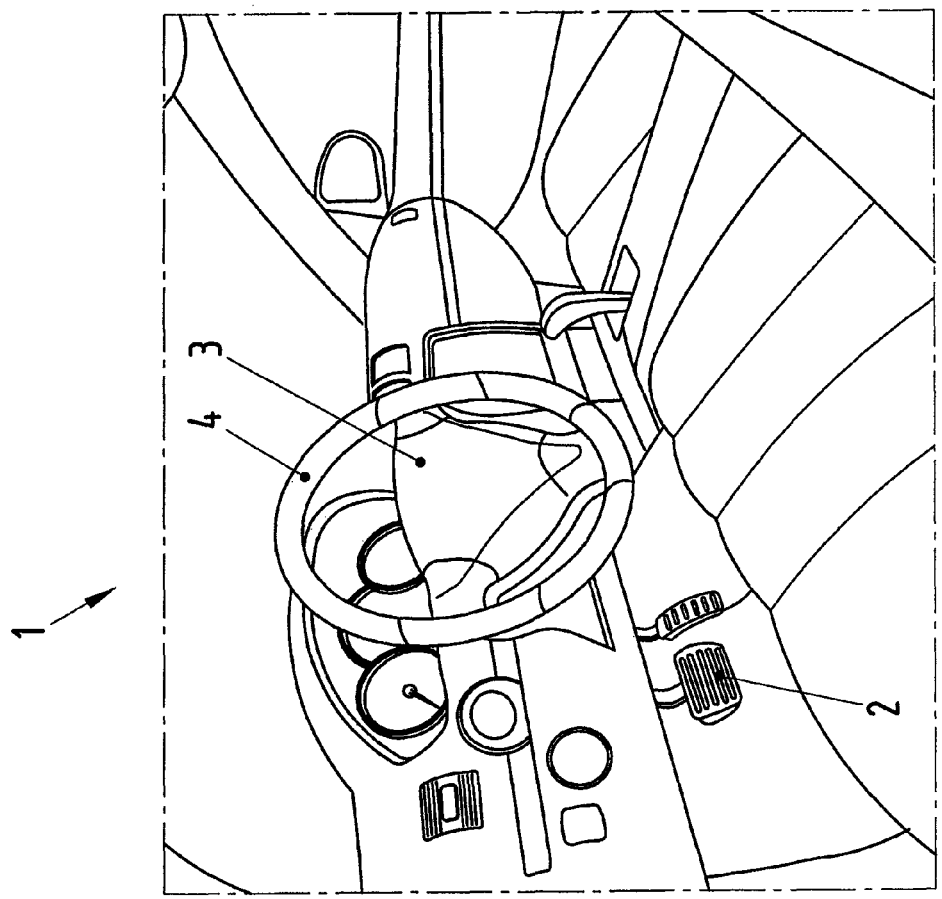
FIG. 1 shows a detail of a hybrid vehicle according to an embodiment of the present invention having an additional actuating element.

According to FIG. 1, a motor vehicle 1 implemented as a hybrid vehicle has at least one electric motor (not shown) which is usable in a non-usage state as a generator and charges a vehicle battery (also not shown) in this state, also referred to in short as the recuperation state. The recuperation state of the electric motor may be initiated by actuating a brake system, in particular by stepping on a brake pedal 2, for example. However, because a driver of the hybrid vehicle 1 may only recognize with difficulty up to which brake pedal position the hybrid vehicle 1 is in a recuperation phase and from which brake pedal position, i.e., from which force to be exerted on the brake pedal 2, the brake system is actuated, the driver may only estimate with difficulty how much he may step on the brake panel 2 to still be in the recuperation phase without actuating the brake system. To allow the most predictive mode of driving possible, an additional actuating element 3 independent of the brake system is provided, using which the electric motor is transferable into its recuperation state without activating the brake system.

The actuating element 3 may be manually operable and situated in the area of a steering wheel 4, for example. It is particularly conceivable that the actuating element 3 is implemented as a steering wheel button or as a steering wheel panel or as a steering column lever. Using the actuating element 3, the driver of the hybrid vehicle 1 may thus initiate the recuperation phase of the electric motor and thus achieve a deceleration of the hybrid vehicle 1. During the recuperation phase, the electric motor operates as a generator and charges the vehicle battery. If the generated braking force is insufficient for the required deceleration, the driver may additionally actuate the brake pedal 2 and thus activate the brake system of the vehicle 1.

It is also conceivable that the electric motor is transferable into its recuperation state via an actuation of the brake system of the hybrid vehicle 1, i.e., via stepping on the brake pedal 2. The brake pedal 2 and the actuating element 3 thus come into consideration in parallel for transferring the electric motor into its recuperation state.

In addition, is conceivable that the additional actuating element 3 is implemented so that it may influence a degree of recuperation of the electric motor. It is conceivable that the electric motor is used for different degrees for recuperation depending on the strength of actuation of the actuating element 3, so that, for example, light actuation of the actuating element only causes a light deceleration of the motor vehicle 1, while a stronger actuation of the actuating element 3 allows a stronger deceleration and thus a higher recuperation rate. If the deceleration of the hybrid vehicle 1 achieved by the actuating element 3 and the recuperation connected thereto is inadequate for the deceleration procedure, the brake pedal 2 may additionally be actuated and the brake system may be activated in a known way.

Through this additional actuating element 3, which is similar in its operation to a retarder in a utility vehicle, the hybrid functionality "recuperation" may be brought more strongly into the consciousness of the driver, who additionally receives the possibility of further reducing the fuel consumption of the hybrid vehicle by his own engagement. In addition, he obtains an actuating capability for starting the recuperation procedure independent of the brake pedal 2, by which less energy is lost via the conventional brake system in a predictive mode of driving. As already noted above, the typical recuperation and brake functions via the brake pedal 2 are still maintained.

Of course, the configuration of the actuating element 3 from FIG. 1 is solely to represent one possible configuration, so that another configuration, for example, on a center console or on a gear shift lever, is also conceivable. In particular, it is also conceivable that the brake pedal 2 has a haptically perceptible pressure point, up to which only the electric motor is transferred into its recuperation state and from which the brake system is additionally activated. In this case, the additional actuating element 3 independent of the brake system is integrated in the brake pedal 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle, comprising:
    at least one electric motor which is usable as a generator during a recuperation phase to charge a vehicle battery;
    an actuating element which is independent of a brake system of the vehicle and which when actuated transfers the electric motor into or out of a recuperation state without activating the brake system; and
    wherein a brake pedal of the brake system provides an additional actuator for transferring the electric motor into the recuperation state, the brake pedal having a haptically perceptible pressure point up to which only the electric motor is transferred into the recuperation state and beyond which the brake system is additionally activated.

2. The hybrid vehicle according to claim 1, wherein the actuating element is a steering wheel button.

3. The hybrid vehicle according to claim 1, wherein the actuating element is a steering wheel paddle.

4. The hybrid vehicle according to claim 1, wherein the actuating element is a steering column lever.

5. The hybrid vehicle according to claim 1, wherein recuperation state actuation through the brake pedal is implemented so that the amount of brake pedal actuation influences a degree of recuperation of the electric motor.

* * * * *